Dec. 28, 1954  A. ARROTT  2,698,406
BALANCEABLE NETWORK MEASURING APPARATUS
Filed Feb. 18, 1950

INVENTOR.
ANTHONY ARROTT

BY Arthur H. Swanson
ATTORNEY.

United States Patent Office 2,698,406
Patented Dec. 28, 1954

2,698,406

BALANCEABLE NETWORK MEASURING APPARATUS

Anthony Arrott, Philadelphia, Pa., assignor to Minneapolis-Honeywell Regulator Company, Minneapolis, Minn., a corporation of Delaware Application February 18, 1950, Serial No. 144,963

10 Claims. (Cl. 318—28)

The general object of the present invention is to provide improved resistance thermometer apparatus for measuring a variable temperature and for producing control effects in response to variations in the temperature measured. In accordance with the present invention, I directly measure the temperature of temperature responsive resistor exposed to the variable temperature to be indirectly measured by comparing the voltage across said variable resistor with the voltage across an adjustable resistor. The apparatus is so arranged that the two voltages compared differ only as a result of a variation in the resistance of the variable resistor, produced by a change in its temperature. When such a difference in voltage is developed, the resistance of the comparison resistor is adjusted to equalize the two voltages. Ordinarily, the adjustable resistor is a slidewire and its adjustment is effected by adjusting a slider contact along the slidewire, and the adjustment position of the slider contact constitutes a measure of the resistance, and, hence, of the temperature of, the variable resistor by an adjustment of the comparison resistor. The primary object of the present invention is to provide simple and effective means for eliminating measurement errors due to variations in the resistance of the leads connected to the temperature responsive resistor. Such variations in lead resistance may be caused by variations in the temperatures of the leads or in the lengths of the leads.

A more specific object of the invention is to eliminate errors in such temperature measurements by the use of separately matched transformer couplings connecting the temperature responsive and comparison resistors either to detector apparatus responsive to the effect of variations in the potentials across the two resistors, or to an alternating current energizing circuit which directly or indirectly provides a common alternating current flowing through the two resistors.

The matching of the two transformers requires the selection of transformers having similar error producing characteristics, such as transformer losses, stray capacitances, etc., so that the measurement circuit errors produced by each transformer may be cancelled out by the errors of the other transformer. The invention thus permits the use of relatively inexpensive transformers, since it is a comparatively simple and inexpensive matter to select pairs of suitably matched transformers from transformers which are produced in large numbers; whereas, when a single coupling transformer is employed in measuring apparatus of the general character described, it is practically impossible to avoid errors resulting from the fact that no such transformer is a perfect or ideal transformer, but invariably has characteristics resulting in measurement errors. The only transformers practically available, which have characteristics approaching those of the perfect or ideal transformer, are the relatively expensive transformers known as "instrument transformers", and those transformers do not approach the ideal closely enough to insure as high a degree of measurement accuracy as is practically desirable.

It is well known that the objectionable effects of variations in the resistance of the leads of a resistance thermometer can be substantially eliminated, or greatly reduced, by the use of a thermometer resistor having a resistance substantially higher than the resistance of its leads. However, it is not practically or economically feasible to use a thermometer resistance element of a suitably high resistance when the element is made of such an expensive resistor material as platinum, as is practically necessary in many resistance thermometer installations.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
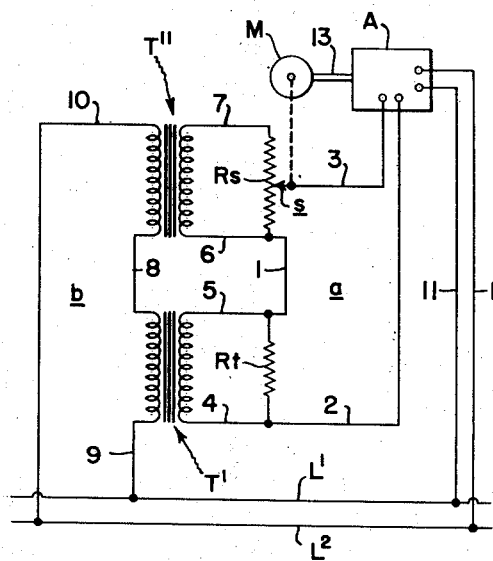
Fig. 1 is a diagram illustrating a resistance thermometer including a preferred embodiment of the present invention.

In the simple form of the invention diagrammatically illustrated in Fig. 1, the temperature responsive resistor, or thermometer resistance $Rt$, is connected in series with a slidewire resistor $Rs$ in a detector circuit $a$. The latter comprises a conductor 1 connecting one end of each resistor to one end of the other, a conductor 2 connecting the second end of the resistor $Rt$ to one input terminal of an amplifier A, and a conductor 3 connecting the second input terminal of the amplifier A to a slider contact $s$ engaging the slidewire resistors $Rs$. The contact $s$ is adjustable along the resistor $Rs$. The ends of the thermometer resistor $Rt$ are connected by conductors 4 and and 5 to the secondary winding of a transformer T'. The end of the resistor $Rs$ connected to the conductor 1 is connected by a conductor 6 to one end of the secondary winding of a transformer T''. The second end of that winding is connected by a conductor 7 to the second end of the resistor $Rs$. It is to be noted that for its comparison purpose, only the portion of the resistors $Rs$ between the conductor 1 and the slider contact $s$ is effective, and that the portion of the resistor Rs between the slider contact $s$ and the conductor 7 merely produces a functionless increase in the lead resistance between the slider contact $s$ and the secondary winding of the transformer T''.

The primary windings of the transformers T' and T'' are connected in series in an energizing circuit $b$ which includes a conductor 8 connecting one end of each primary winding to one end of the other, and conductors 9 and 10 respectively connecting the second ends of the primary windings of the transformers T' and T'' to alternating current supply conductors L' and L². Since the primary windings of the transformers T' and T'' are connected in series, the same energizing current flows through both transformer primary windings. Consequently, if the transformers T' and T'' were so-called "ideal" transformers, the current flow established in the secondary winding of the transformer T' would have exactly the same magnitude and phase as the current flow established in the secondary winding of the transformer T''. The same current flows would be established in each transformer secondary winding circuit, notwithstanding differences in the impedances of the circuits to which those secondary windings are connected. Further, this relationship between the current flows established in the said transformer secondary windings is one which would be maintained regardless of the changes in the voltage supplied by the alternating current supply conductors L' and L².

Although neither of the transformers T' and T'' is an "ideal" transformer, the proper selection and matching of these transformers and their association in the manner described makes it possible substantially to attain the condition in which the current flow in the secondary winding of the transformer T' is exactly the same in magnitude and phase as that in the secondary winding of the transformer T'', notwithstanding differences in the loads connected to those secondary windings or changes in the alternating current supply voltage.

In Fig. 1, the windings of the transformers T' and T'' are so related and connected to the circuits $a$ and $b$ which are coupled by the transformers that the voltages simultaneously induced in the two secondary windings are of opposite phases and tend to produce currents flowing in opposite directions through the conductor 1. In the normal balanced condition of the apparatus, said opposing voltages are equal and there is no current flow in the detector circuit. When a change in the temperature of resistor R*t* creates a current flow in the detector circuit, the amplifier A energizes a rebalancing motor M through a connection 13 for operation in one direction or the other as required to adjust the slider contact *s* in the direction and to the extent required to equalize the secondary voltages and thereby interrupt the current flow in the detector circuit.

The amplifier A and rebalancing motor M may be of various forms and types. In particular, they may well be of the commercially available type employed in the widely used self-balancing potentiometric measuring instrument disclosed in the Willis Patent 2,423,540, of July 8, 1947. In accordance with the usual practice of the art, the motor M may be coupled to adjust a recorder pen arm and an air controller, as well as the slider contact *s*, on a change in the temperature of the thermometer resistor R*t*. In said Willis patent, a converter is employed to convert a small initial D. C. signal into an A. C. signal prior to the amplification of the latter. In the apparatus disclosed here, there is no initial D. C. signal, and no converter is needed. As shown, the amplifier A is energized by alternating current supplied through the branches 11 and 12 of the alternating current supply conductors L' and L².

As those skilled in the art will understand, all of the apparatus shown in Fig. 1, except the terminal conductors 1, 2, 4 and 5 of the resistor R*t*, and the supply conductors L' and L² and their branches, may be enclosed in an instrument housing located at a distance from the furnace or other place in which the temperature responsive resistor R*t* is exposed to the temperature to be measured. The variations in resistance of the terminal conductors 4 and 5 of the resistor R*t* have no significant effect on the accuracy of the measurements obtained, since the same energizing current flows through the resistors R*t* and R*s*, and the accuracy of the measurements are not significantly affected by ordinary variations in the voltage across the supply conductors L' and L², or in the resistance of the circuit *a*.

Figure 2:
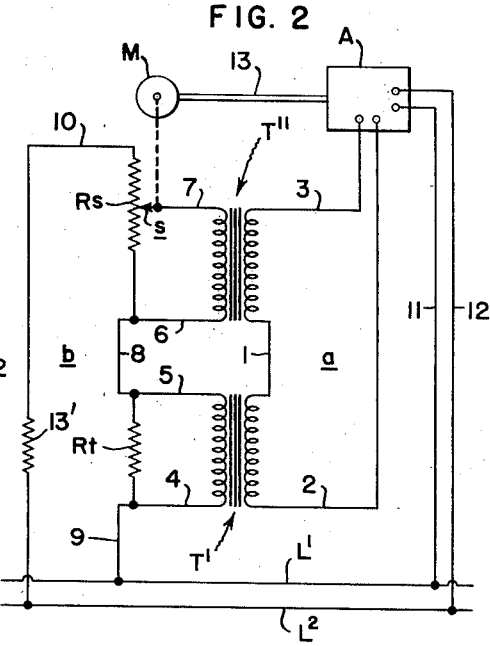
Fig. 2 is a diagram illustrating one desirable modification of the apparatus shown in Fig. 1.

In the form of the invention shown in Fig. 2, the transformers T' and T" and the thermometer and slidewire resistors R*t* and R*s* of Fig. 1 are so transposed that the secondary windings of the transformers T' and T" of Fig. 2 in the measuring circuit *a* are connected in series with the conductors 1, 2 and 3, and the resistors R*t* and R*s* are connected in the energizing circuit *b* in series with the conductors 8, 9 and 10 between the supply conductors L' and L².

A suitable voltage dropping resistor 13' is connected in the conductor 10, as shown. In Fig. 2, the resistor R*t* is connected by the terminal conductors 4 and 5 to the primary winding of the transformer T', and the terminal conductors 6 and 7 of the slidewire resistor R*s* are connected to the primary winding of the transformer T". In Fig. 1, the transformers T' and T" operate as current transformers, and in Fig. 2 they operate as potential transformers.

In Fig. 2 as in Fig. 1, the rebalancing motor M is adapted to adjust the slider contact *s* on changes in the temperature and resistance of the thermometer resistor R*t*, as required to make the potential difference between the conductors 1 and 2 equal in magnitude and opposite in phase to the opposing potential difference between the conductors 1 and 3. In the balanced condition of the apparatus shown in Fig. 2, as in that shown in Fig. 1, there is no significant current flow through any of the conductors 1, 2, 3, 4, 5, 6 and 7, and, hence, there is insignificant measurement error due to variations in the resistances of the terminal conductors connected to the terminals of the resistor R*t*.

If the transformers T' and T" were "ideal" transformers, there would be no current flow at all through the conductors 1, 2, 3, 4, 5, 6 and 7 in the balanced condition of the apparatus shown in Fig. 2. Accordingly, if the transformers T' and T" were "ideal" transformers, there would be no measurement errors due to variations in the resistances of the conductors connected to the terminals of the resistor R*t* or changes in the alternating current supply voltage.

With suitably matched transformers T' and T", the measurement errors which each transformer tends to produce because its characteristics are not those of a perfect, or ideal, transformer, are largely neutralized or cancelled out by the errors in the performance of the other transformer. In practice, the measurement errors due to the imperfections of the matched transformers which are not cancelled out can be minimized by properly designing the measuring unit, and, in particular, suitably relating the numbers of turns or convolutions in the transformer primary and secondary windings, by suitably relating resistance values of the variable resistor and the slidewire or comparison resistor, by keeping the fraction of the window area for each secondary winding high relative to the total window area, and by making the resistivity of the wire used in the transformer windings suitably large or small. In general, it is desirable that the winding of the transformer T' directly associated with the variable resistor R*t* should have more turns than the other winding of the transformer. Thus in Fig. 1, the secondary winding of the transformer T' should have more turns than the primary winding of that transformer. This means, of course, that the secondary winding of the matched transformer T" should have more turns than the primary winding of that transformer. With the arrangement shown in Fig. 2, in which the primary winding of the transformer T' is directly associated with the variable resistor R*t*, the primary winding of each of the transformers T' and T" should have more turns than the secondary windings of said transformers. In practical use, the apparatus shown in each of Figs. 1 and 2 is very satisfactory. The arrangement shown in Fig. 1 has the advantage, however, that for a given strength of current through the resistor R*t*, its sensitivity is greater than that of the apparatus shown in Fig. 2, in which the transformers T' and T" step down the voltage applied to the amplifier A.

In the normal balanced condition of the apparatus shown in Fig. 2, the adjustment of the slider *s* is such that the voltage applied to the primary winding of the transformer T" is equal to the voltage applied to the primary winding of the transformer T', and there is then no current flow in either secondary winding. Hence, there is then no significant current flow in the primary windings of the transformers T' and T", or in the leads 4 and 5 of the resistor R*t*. In consequence, the accuracy of the measurements obtained when the measuring apparatus is in its balanced condition does not depend on the length or temperature of either or both of the lead conductors 4 and 5 of the resistor R*t*.

Figure 3:
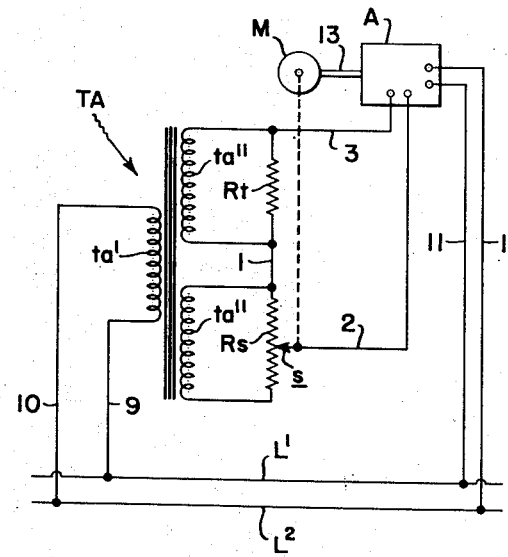
Figs. 3 and 4 diagrammatically illustrate other modifications of the apparatus shown in Fig. 1.
Figure 4:
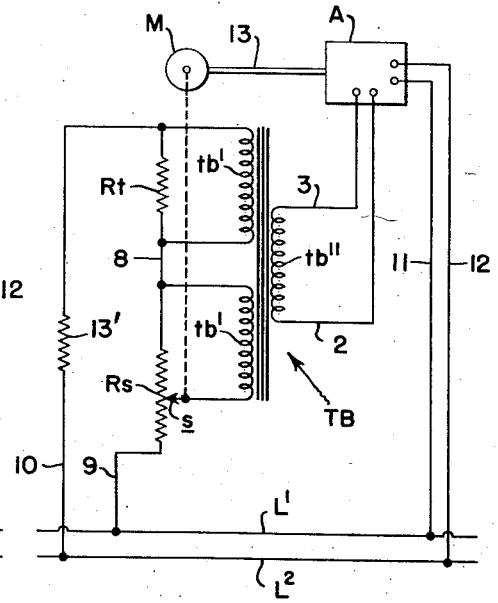

While Figs. 1 and 2 illustrate preferred forms of the invention, advantageous results are obtainable with the less desirable forms of the invention illustrated in Figs. 3 and 4. The arrangement shown in Fig. 3 differs essentially from the arrangement shown in Fig. 1 in that the two transformers T' and T" of Fig. 1 are replaced in Fig. 3 by a single transformer TA. The latter includes a single primary winding *ta'* in inductive relation with each of two transformer secondary windings *ta"*. The windings *ta"* are respectively associated with the resistors R*t* and R*s*, as are the secondary windings of the two transformers of Fig. 1. The arrangement of the apparatus shown in Fig. 3 is such that the single primary winding induces equal voltages of opposing phases in the two secondary windings. However, the Fig. 3 arrangement is susceptible to measurement errors, avoided with the arrangements shown in Figs. 1 and 2, for the arrangements shown in Figs. 1 and 2, for the reason that the relationship of the current flow in the closed circuit including the transformer secondary winding *ta"* and the thermometer resistor R*t* to the current flow through the closed circuit including the transformer secondary winding *ta"* and the slidewire resistor R*s* is not maintained constant upon variation in the resistance of the thermometer resistor R*t* or its leads. This undesired effect can be minimized by suitable design of the transformer TA.

The arrangement shown in Fig. 4 differs from that shown in Fig. 2 in that it includes a three winding transformer TB in lieu of the two transformers T' and T" of Fig. 2. The transformer TB differs from the transformer TA of Fig. 3 in that it comprises a single secondary winding *tb"* and two primary windings *tb'*. The latter are associated with the temperature responsive and slidewire resistors $R_t$ and $R_s$, respectively, as are the primary windings of the two transformers shown in Fig. 2. The single secondary winding $tb''$ of Fig. 4 is in inductive relation with each of the primary windings $tb'$, and is connected across the input terminals of the amplifier A. In the balanced condition of the apparatus shown in Fig. 4, the opposing voltages induced in winding $tb''$ do not prevent some currents flow through the conductors or leads connecting the resistors to the respective primary windings $tb'$. The overall operation of the apparatus shown in Fig. 4 differs from that of the apparatus shown in Fig. 2 in the same general manner in which the operation of the apparatus shown in Fig. 3 differs from that of the apparatus shown in Fig. 1.

The energizing conductors 9 and 10 in each of Figs. 1 through 4, for purposes of simplification of the drawing, have been shown as being directly connected to the same alternating current supply conductors L' and L² which supply energizing current to the amplifier A and motor M. Those skilled in the art will understand, however, that the conductors 9 and 10 may be connected to the supply conductors L' and L² through a suitable step-down transformer.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Temperature measuring apparatus, comprising a temperature responsive resistor having end terminals and adapted to be exposed to a temperature to be measured at a position remote from the remainder of the apparatus, a comparison resistor having end terminals and having a contact terminal adjustable along and engaging the last mentioned resistor, a pair of energizing terminals adapted to be connected to a source of alternating energizing current, current responsive means having a pair of input terminals, circuit coupling means including a first winding, a second winding, and winding means inductively coupled to said first and second windings, lead conductor means connecting said end terminals of said remotely located responsive resistor to the remainder of the apparatus and comprising first, second, third, and fourth lead conductors, a first series circuit including said first lead conductor connected between one of said end terminals of said responsive resistor and one of said terminals of said comparison resistor, including said second lead conductor connected between the other of said end terminals of said responsive resistor and one terminal of one of said pairs of terminals, and including a connection between the other terminal of said one pair of terminals and another of said terminals of said comparison resistor, a circuit connecting said responsive resistor directly across said first winding and including said third lead conductor connected between one of said end terminals of said responsive resistor and one end of said first winding, and including said fourth lead conductor connected between the other of said end terminals of said responsive resistor and the remaining end of said first winding, conductors connecting said second winding between the remaining one of said terminals of said comparison resistor and another of the said terminals thereof, conductors connecting said winding means in a second series circuit between the terminals of the other of said pairs of terminals, whereby the entire resistance of said responsive and comparison resistors is effectively connected in series between said energizing terminals while the entire resistance of said responsive resistor and the resistance of said comparison resistor between the first mentioned one of said terminals thereof and said contact terminal are effectively connected in series between said input terminals, said coupling means being operative, when energized by current flow in the series circuit connected between said energizing terminals, to impress voltages of opposing phases in the series circuit connected between said input terminals, and a responsive device included in said responsive means and operative in response to a resultant current flow between said input terminals to adjust said contact along said comparison resistor as necessary to equalize said voltages of opposing phases and hence eliminate said resultant current.

2. Apparatus as specified in claim 1, wherein said winding means comprises third and fourth windings, wherein said first winding and said third winding are inductively coupled and form a first transformer, wherein said second and fourth windings are inductively coupled and form a second transformer, and wherein said first and second transformers are similar in construction, type, and size, and have matched characteristics.

3. Apparatus as specified in claim 2, wherein said first and second transformers have similar no-load losses and stray capacitances.

4. Apparatus as specified in claim 1, wherein said coupling means is a single transformer.

5. Temperature measuring apparatus, comprising a temperature responsive resistor having end terminals and adapted to be exposed to a temperature to be measured at a position remote from the remainder of the apparatus, a comparison resistor having end terminals and having a contact terminal adjustable along and engaging the last mentioned resistor, a pair of energizing terminals adapted to be connected to a source of alternating energizing current, current responsive means having a pair of input terminals, circuit coupling means including a first winding, a second winding, and winding means inductively coupled to said first and second windings, lead conductor means connecting said end terminals of said remotely located responsive resistor to the remainder of the apparatus and comprising first, second, third, and fourth lead conductors, a first series circuit including said first lead conductor connected between one of said end terminals of said responsive resistor and one of said terminals of said comparison resistor, including said second lead conductor connected between the other of said end terminals of said responsive resistor and one of said input terminals, and including a connection between the other of said input terminals and another of said terminals of said comparison resistor, a circuit connecting said responsive resistor directly across said first winding and including said third lead conductor connected between one of said end terminals of said responsive resistor and one end of said first winding, and including said fourth lead conductor connected between the other of said end terminals of said responsive resistor and the remaining end of said first winding, conductors connecting said second winding between said end terminals of said comparison resistor, conductors connecting said winding means in a second series circuit between said energizing terminals, whereby the entire resistance of said responsive and comparison resistors is effectively connected in series between said energizing terminals while the entire resistance of said responsive resistor and the resistance of said comparison resistor between the first mentioned one of said terminals thereof and said contact terminal are effectively connected in series between said input terminals, said coupling means being operative, when energized by current flow in the series circuit connected between said energizing terminals, to impress voltages of opposing phases in the series circuit connected between said input terminals, and a responsive device included in said responsive means and operative in response to a resultant current flow between said input terminals to adjust said contact along said comparison resistor as necessary to equalize said voltages of opposing phases and hence eliminate said resultant current.

6. Temperature measuring apparatus, comprising a temperature responsive resistor having end terminals and adapted to be exposed to a temperature to be measured at a position remote from the remainder of the apparatus, a comparison resistor having end terminals and having a contact terminal adjustable along and engaging the last mentioned resistor, a pair of energizing terminals adapted to be connected to a source of alternating energizing current, current responsive means having a pair of input terminals, circuit coupling means including a first winding, a second winding, and winding means inductively coupled to said first and second windings, lead conductor means connecting said end terminals of said remotely located responsive resistor to the remainder of the apparatus and comprising first, second, third, and fourth lead conductors, a first series circuit including said first lead conductor connected between one of said end terminals of said responsive resistor and one of said end terminals of said comparison resistor, including said second lead conductor connected between the other of said end terminals of said responsive resistor and one of said energizing terminals, and including a connection between the other of said energizing terminals and the other of said end terminals of said comparison resistor, a circuit connecting said responsive resistor directly across said first winding and including said third lead conductor connected between one of said end terminals of said responsive resistor and one end of said first winding, and including said fourth lead conductor connected between the other of said end terminals of said responsive resistor and the remaining end of said first winding, conductors connecting said second winding between one of said end terminals of said comparison resistor and said contact terminal thereof, conductors connecting said winding means in a second series circuit between said input terminals, whereby the entire resistance of said responsive and comparison resistors is effectively connected in series between said energizing terminals while the entire resistance of said responsive resistor and the resistance of said comparison resistor between the last mentioned one of said end terminals thereof and said contact terminals are effectively connected in series between said input terminals, said coupling means being operative, when energized by current flow in the series circuit connected between said energizing terminals, to impress voltages of opposing phases in the series circuit connected between said input terminals, and a responsive device included in said responsive means and operative in response to a resultant current flow between said input terminals to adjust said contact along said comparison resistor as necessary to equalize said voltages of opposing phases and hence eliminate said resultant current.

7. Temperature measuring apparatus, comprising a temperature responsive resistor having end terminals and adapted to be exposed to a temperature to be measured at a position remote from the remainder of the apparatus, a comparison resistor having end terminals and having a contact terminal adjustable along and engaging the last mentioned resistor, a pair of energizing terminals adapted to be connected to a source of alternating energizing current, current responsive means having a pair of input terminals, first and second transformers, each having a primary winding and a secondary winding inductively coupled thereto, lead conductor means connecting said end terminals of said remotely located responsive resistor to the remainder of the apparatus and comprising first, second, third, and fourth lead conductors, a first series circuit including said first lead conductor connected between one of said end terminals of said responsive resistor and one of said end terminals of said comparison resistor, including said second lead conductor connected between the other of said end terminals of said responsive resistor and one of said input terminals, and including a connection between the other of said input terminals and said contact terminal of said comparison resistor, a circuit connecting said responsive resistor directly across said secondary winding of said first transformer and including said third lead conductor connected between one of said end terminals of said responsive resistor and one end of the last mentioned winding, and including said fourth lead conductor connected between the other of said end terminals of said responsive resistor and the remaining end of said last mentioned winding, conductors connecting said secondary winding of said second transformer between said end terminals of said comparison resistor, conductors connecting said primary windings of said transformers in series in a second series circuit between said energizing terminals, whereby the entire resistance of said responsive and comparison resistors is effectively connected in series between said energizing terminals while the entire resistance of said responsive resistor and the resistance of said comparison resistor between said one of said end terminals thereof and said contact terminal are effectively connected in series between said input terminals, said transformers being operative, when energized by current flow in the series circuit connected between said energizing terminals, to impress voltages of opposing phases in the series circuit connected between said input terminals, and a responsive device included in said responsive means and operative in response to a resultant current flow between said input terminals to adjust said contact along said comparison resistor as necessary to equalize said voltages of opposing phases and hence eliminate said resultant current.

8. Temperature measuring apparatus, comprising a temperature responsive resistor having end terminals and adapted to be exposed to a temperature to be measured at a position remote from the remainder of the apparatus, a comparison resistor having end terminals and having a contact terminal adjustable along and engaging the last mentioned resistor, a pair of energizing terminals adapted to be connected to a source of alternating energizing current, current responsive means having a pair of input terminals, first and second transformers, each having a primary winding and a secondary winding inductively coupled thereto, lead conductor means connecting said end terminals of said remotely located responsive resistor to the remainder of the apparatus and comprising first, second, third, and fourth lead conductors, a first series circuit including said first lead conductor connected between one of said end terminals of said responsive resistor and one of said end terminals of said comparison resistor, including said second lead cnductor connected between the other of said end terminals of said responsive resistor and one of said energizing terminals, and including a connection between the other of said energizing terminals and the other of said end terminals of said comparison resistor, a circuit connecting said responsive resistor directly across said primary winding of said first transformer and including said third lead conductor connected between one of said end terminals of said responsive resistor and one end of the last mentioned winding, and including said fourth lead conductor connected between the other of said end terminals of said responsive resistor and the remaining end of said last mentioned winding, conductors connecting said primary winding of said second transformer between said one of said end erminals of said comparison resistor and said contact erminal thereof, conductors connecting said secondary windings of said transformers in series in a second series circuit between said input terminals, whereby the entire resistance of said responsive and comparison resistors is effectively connected in series between said energizing terminals while the entire resistance of said responsive resistor and the resistance of said comparison resistor between said one of said end terminals thereof and said contact terminal are effectively connected in series between said input terminals, said transformers being operative, when energized by current flow in the series circuit connected between said energizing terminals, to impress voltages of opposing phases in the series circuit connected between said input terminals, and a responsive device included in said responsive means and operative in response to a resultant current flow between said input terminals to adjust said contact along said comparison resistor as necessary to equalize said voltages of opposing phases and hence eliminate said resultant current.

9. Temperature measuring apparatus, comprising a temperature responsive resistor having end terminals and adapted to be exposed to a temperature to be measured at a position remote from the remainder of the apparatus, a comparison resistor having end terminals and having a contact terminal adjustable along and engaging the last mentioned resistor, a pair of energizing terminals adapted to be connected to a source of alternating energizing current, current responsive means having a pair of input terminals, a transformer having a primary winding and first and second secondary windings inductively coupled thereto, lead conductor means connecting said end terminals of said remotely located responsive resistor to the remainder of the apparatus and comprising first, second, third, and fourth lead conductors, a first series circuit including said first lead conductor connected between one of said end terminals of said responsive resistor and one of said end terminals of said comparison resistor, including said second lead conductor connected between the other of said end terminals of said responsive resistor and one of said input terminals, and including a connection between the other of said input terminals and said contact terminal of said comparison resistor, a circuit connecting said responsive resistor directly across said first secondary winding of said transformer and including said third lead conductor connected between one of said end terminals of said responsive resistor and one end of the last mentioned winding, and including said fourth lead conductor connected between the other of said end terminals of said responsive resistor and the remaining end of said last mentioned winding, conductors connecting said second secondary winding of said transformer between said end terminals of said comparison resistor, conductors connecting said primary winding of said transformer in a second series circuit between said energizing terminals, whereby the entire resistance of said responsive and comparison resistors is effectively connected in series between said energizing terminals while the entire resistance of said responsive resistor and the resistance of said comparison resistor between said one of said end terminals thereof and said contact terminal are effectively connected in series between said input terminals, said transformer being operative, when energized by current flow in the series circuit connected between said energizing terminals, to impress voltages of opposing phases in the series circuit connected between said input terminals, and a responsive device included in said responsive means and operative in response to a resultant current flow between said input terminals to adjust said contact along said comparison resistor as necessary to equalize said voltages of opposing phases and hence eliminate said resultant current.

10. Temperature measuring apparatus, comprising a temperature responsive resistor having end terminals and adapted to be exposed to a temperature to be measured at a position remote from the remainder of the apparatus, a comparison resistor having end terminals and having a contact terminal adjustable along and engaging the last mentioned resistor, a pair of energizing terminals adapted to be connected to a source of alternating energizing current, current responsive means having a pair of input terminals, a transformer having first and second primary windings and a secondary winding inductively coupled thereto, lead conductor means connecting said end terminals of said remotely located responsive resistor to the remainder of the apparatus and comprising first, second, third, and fourth lead conductors, a first series circuit including said first lead conductor connected between one of said end terminals of said responsive resistor and one of said end terminals of said comparison resistor, including said second lead conductor connected between the other of said end terminals of said responsive resistor and one of said energizing terminals, and including a connection between the other of said energizing terminals and the other of said end terminals of said comparison resistor, a circuit connecting said responsive resistor directly across said first primary winding of said transformer and including said third lead conductor connected between one of said end terminals of said responsive resistor and one end of the last mentioned winding, and including said fourth lead conductor connected between the other of said end terminals of said responsive resistor and the remaining end of said last mentioned winding, conductors connecting said second primary winding of said transformer between said one of said end terminals of said comparison resistor and said contact terminal thereof, conductors connecting said secondary winding of said transformer in a second series circuit between said input terminals, whereby the entire resistance of said responsive and comparison resistors is effectively connected in series between said energizing terminals while the entire resistance of said responsive resistor and the resistance of said comparison resistor between said one of said end terminals thereof and said contact terminal are effectively connected in series between said input terminals, said transformer being operative, when energized by current flow in the series circuit connected between said energizing terminals, to impress voltages of opposing phases in the series circuit connected between said input terminals, and a responsive device included in said responsive means and operative in response to a resultant current flow between said input terminals to adjust said contact along said comparison resistor as necessary to equalize said voltages of opposing phases and hence eliminate said resultant current.

References Cited in the file of this patent

UNITED STATES PATENTS

| Number | Name | Date |
|---|---|---|
| 2,134,901 | Wey | Nov. 1, 1938 |
| 2,232,077 | Rosecky | Feb. 18, 1941 |
| 2,310,955 | Hornfeck | Feb. 16, 1943 |
| 2,450,084 | Emerson | Sept. 28, 1948 |
| 2,491,606 | Dickey et al. | Dec. 20, 1949 |
| 2,526,496 | Michaelis | Oct. 17, 1950 |
| 2,593,351 | Shannon | Apr. 15, 1952 |
| 2,611,812 | Hornfeck | Sept. 23, 1952 |
| 2,612,628 | Hornfeck | Sept. 30, 1952 |
| 2,624,012 | English | Dec. 30, 1952 |

OTHER REFERENCES

Electrical Measurements, Laws, McGraw-Hill Book Co., 1938

"Electronic Computers"—Shannon.

"Electronics," August 1946, pp. 110–113.